(12) United States Patent
Konstantinou et al.

(10) Patent No.: US 10,820,221 B2
(45) Date of Patent: *Oct. 27, 2020

(54) SYSTEM AND METHOD FOR ACCESS POINT SELECTION AND SCORING BASED ON MACHINE LEARNING

(71) Applicant: Verizon Patent and Licensing Inc., Arlington, VA (US)

(72) Inventors: Kyriaki Konstantinou, New York, NY (US); Ye Ouyang, Piscataway, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,284

(22) Filed: May 13, 2019

(65) Prior Publication Data

US 2019/0306736 A1 Oct. 3, 2019

Related U.S. Application Data

(63) Continuation of application No. 15/497,326, filed on Apr. 26, 2017, now Pat. No. 10,334,463.

(51) Int. Cl.
*H04W 64/00* (2009.01)
*H04W 24/08* (2009.01)
*H04W 24/02* (2009.01)
*H04W 24/04* (2009.01)
*H04W 60/00* (2009.01)

(52) U.S. Cl.
CPC ........... *H04W 24/08* (2013.01); *H04W 24/02* (2013.01); *H04W 24/04* (2013.01); *H04W 60/00* (2013.01)

(58) Field of Classification Search
CPC ...... H04W 24/08; H04W 24/02; H04W 60/00
See application file for complete search history.

(56) References Cited

U.S. PATENT DOCUMENTS

| 2012/0290636 | A1 | 11/2012 | Kadous |
| 2015/0131483 | A1* | 5/2015 | Colban ................. H04W 48/16 370/254 |
| 2017/0164135 | A1 | 6/2017 | Kadaypak |
| 2018/0317106 | A1 | 11/2018 | Konstantinou et al. |

* cited by examiner

*Primary Examiner* — Lan-Huong Truong

(57) ABSTRACT

A device may receive information that identifies a first set of parameter values associated with a first set of access points. The first set of access points may be associated with a set of known access point quality scores. The device may generate a model based on the set of known access point quality scores and the first set of parameter values. The device may receive information that identifies a second set of parameter values associated with a second set of access points. The device may determine a set of access point quality scores, for the second set of access points, based on the second set of parameter values and the model. The device may provide information to permit an action to be performed in association with the second set of access points.

20 Claims, 9 Drawing Sheets

SYSTEM AND METHOD FOR ACCESS POINT SELECTION AND SCORING BASED ON MACHINE LEARNING

RELATED APPLICATION

This application is a continuation of U.S. patent application Ser. No. 15/497,326, filed Apr. 26, 2017, which is incorporated herein by reference.

BACKGROUND

A user device may connect to various access networks, such as cellular networks, wireless local area networks (WLANs), or the like, to enable functionality associated with applications (e.g., text messaging applications, social media applications, web browsing applications, etc.). Various access networks may be associated with different network performance based on different conditions. For example, network performance may refer to the quality of services offered by a particular network, and may be based on various metrics such as network bandwidth, network throughput, network delay, network errors, etc.

DETAILED DESCRIPTION OF PREFERRED EMBODIMENTS

Figure 1A:
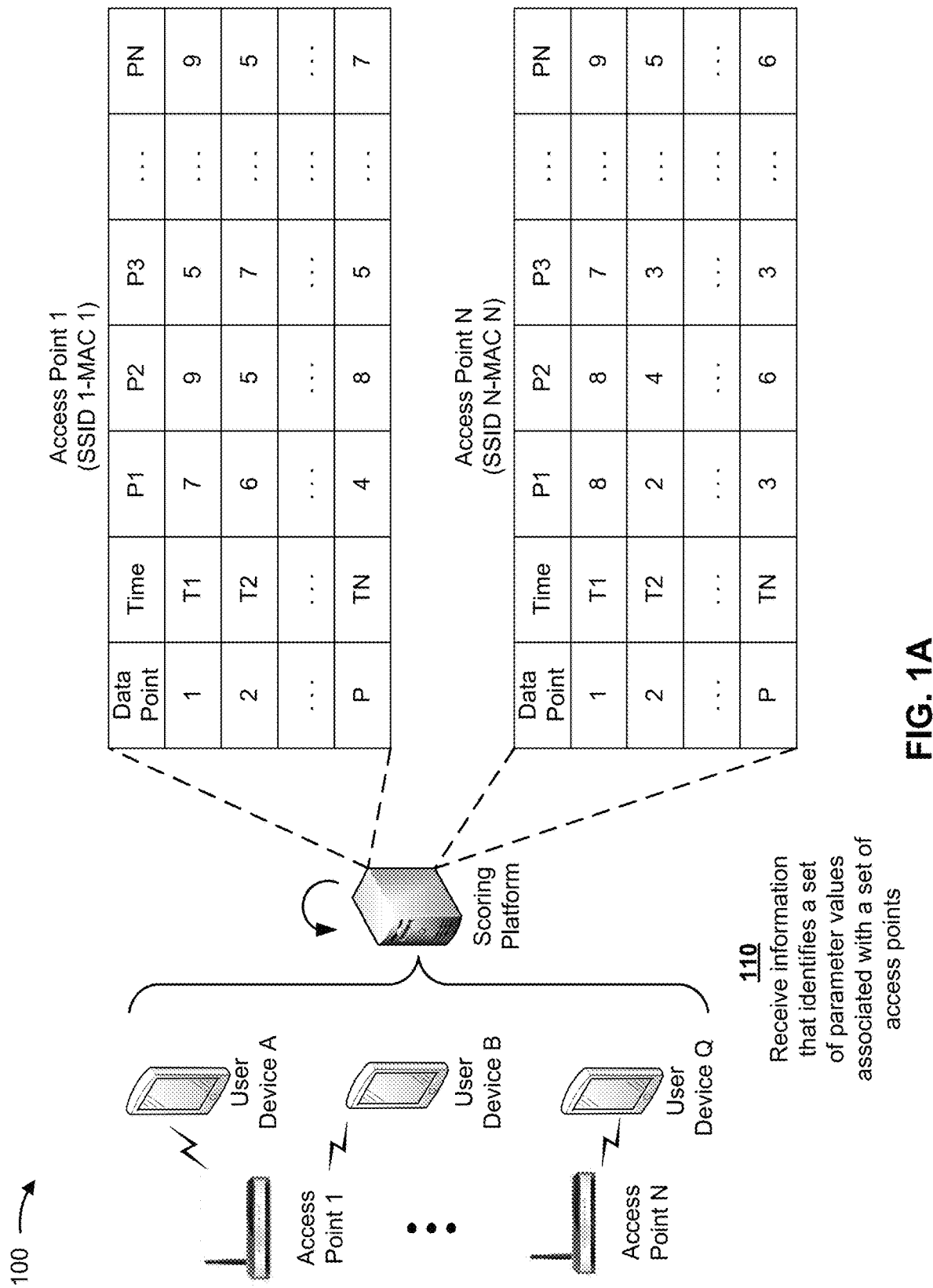
FIGS. 1A-1F are diagrams of an overview of an example implementation described herein.

The following detailed description of example implementations refers to the accompanying drawings. The same reference numbers in different drawings may identify the same or similar elements.

A user device may connect to an access network based on a user input. That is, a user may manually configure the user device to connect to a cellular network, a WLAN, or another type of access network. Based on the configuration, the user device may remain connected to the access network regardless of the availability of other networks or of a network metric value associated with the access network (e.g., a network metric value, such as a signal quality value, a throughput value, a latency value, or the like), and/or a network metric value associated with another access network that is available for connectivity (e.g., a greater signal quality value, a lower latency value, etc. than as compared to the access network).

In some cases, the user device may have access to limited information regarding available access networks. For example, the user device may receive information that identifies respective identifiers of the available access networks, security parameters associated with the access networks, or the like. Additionally, the user device may not have access to information that is indicative of network performance of the available access networks. As such, the user device may connect to a particular access network via an access point that offers reduced network performance or network quality as compared to another available access network (e.g., reduced throughput, increased latency, increased packet loss, etc.).

Some implementations described herein provide a scoring platform to receive information that identifies parameter values associated with a set of access points. Additionally, some implementations described herein enable the scoring platform to generate models based on known access point quality scores and known parameter values. Additionally, some implementations described herein enable the scoring platform to determine access point quality scores for other access points using the models and parameter values associated with the other access points. Additionally, some implementations described herein enable the scoring platform to provide, based on the access point quality scores, information that permits and/or causes an action to be performed in association with an access point and/or an access network.

In this way, a user device may receive information that enables the user device to base a connectivity decision on respective access point quality scores of available access points. Additionally, in this way, the user device may connect to a particular access network via a particular access point that is associated with improved network performance as compared to another access network and/or access point.

While implementations herein describe access point quality scores, it should be understood that an access point quality score may correspond to an access point and/or an access network to which the access point enables access. For example, an access point quality score may be indicative of network performance of an access network to which an access point enables access.

While implementations herein describe particular types of access points, access networks, and/or particular communication protocols, such as the Institute of Electrical and Electronic Engineers (IEEE) 802.11 (i.e., Wi-Fi), it should be understood that implementations described herein are applicable to other types of access points, access networks, and/or communication protocols (e.g., IEEE 802.15.4 (i.e., ZigBee), IEEE 802.15.1 (i.e., Bluetooth), etc.).

FIGS. 1A-1F are diagrams of an overview of an example implementation 100 described herein. As shown in FIG. 1A, and by reference number 110, a scoring platform may receive information that identifies a set of parameter values associated with a set of access points. For example, the scoring platform may receive and/or access information associated with hundreds, thousands, millions, etc. of access points.

In some implementations, user devices (e.g., smart phones, tablet computers, Internet of Thing (IoT) devices, or the like) may connect to an access network via an access point. Additionally, a user device may determine and/or measure parameter values associated with a set of parameters based on the connection. For example, the user device may measure a throughput value, a received signal strength indictor (RSSI) value, a latency value, etc. Other parameter values associated with other parameters are described elsewhere herein.

In some implementations, the scoring platform may receive thousands, millions, billions, etc. of data points associated with the set of access points. For example, the scoring platform may receive a data point that includes information that identifies an access point (e.g., a service set identifier (SSID), a network address (e.g., an Internet Protocol (IP) address, a Media Access Control (MAC) address, or the like), information that identifies a time frame for which the data point is applicable, and/or one or more parameter values.

As an example, and as shown, the scoring platform may receive information associated with data points (e.g., data point 1, data point 2, . . . , data point P) that include parameter values associated with a set of parameters (e.g., P1, P2, . . . , PN). Additionally, the data points may correspond to particular time frames (e.g., T1, T2, . . . , TN).

Figure 1B:
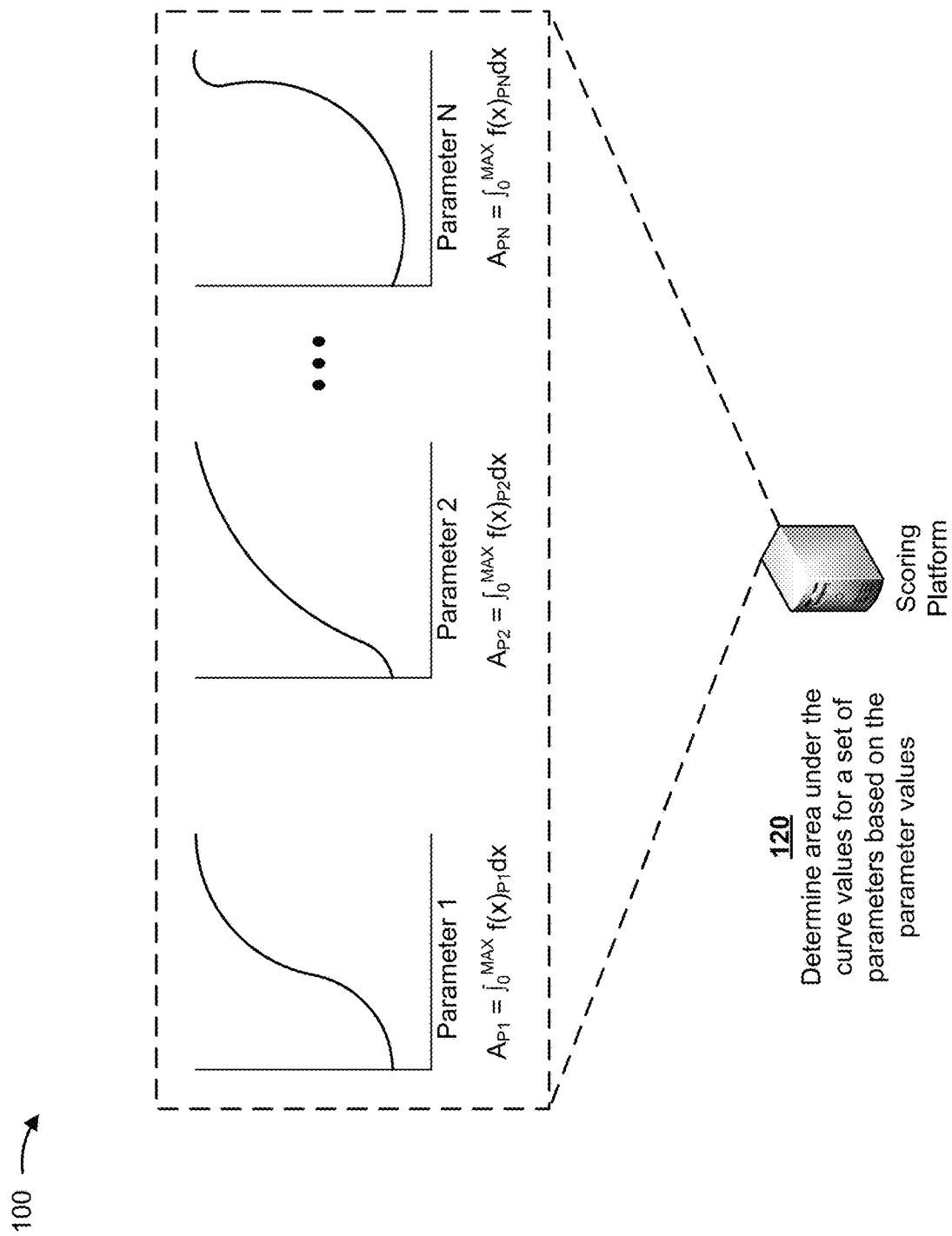

As shown in FIG. 1B, and by reference number 120, the scoring platform may determine area under the curve values for a set of parameters based on the parameter values. For example, and as described elsewhere herein, the scoring platform may generate cumulative distribution function (CDF) curves for the set of parameters based on parameter values associated with data points of a particular access point. For example, the scoring platform may generate a CDF curve for throughput values associated with the access point, a CDF curve for RSSI values associated with the access point, etc. As an example, and as shown, the scoring platform may determine area under the curve values (e.g., $A_{P1}, A_{P2}, \ldots A_{PN}$) associated with a set of parameters.

Figure 1C:
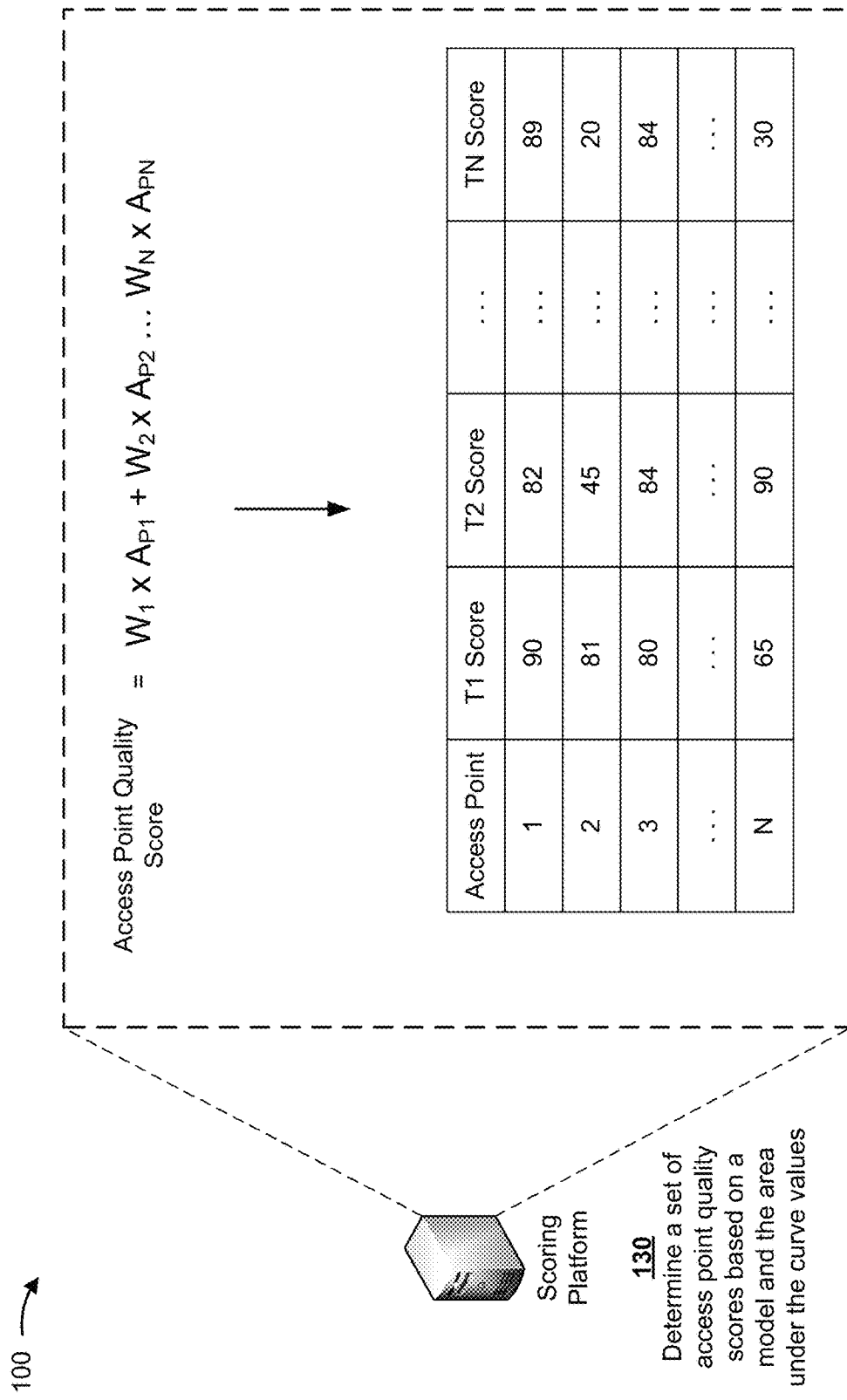

As shown in FIG. 1C, and by reference number 130, the scoring platform may determine a set of access point quality scores based on a model and the area under the curve values. In some implementations, an access point quality score may include a score, a rank, a designation, or the like, that enables comparison of access points. For example, an access point quality score may be indicative of network performance of an access network and/or an access point that is associated with the access point quality score. In other words, an access point that is associated with a greater access point quality score than as compared to another access point may provide increased throughput, reduced latency, etc. than as compared to the other access point.

As described elsewhere herein, the scoring platform may train a set of models based on known access point quality scores and known parameter values. Additionally, the scoring platform may use the models when determining access point quality scores. For example, as shown, the scoring platform may determine access point quality scores based on weight values (e.g., $W_1, W_2, \ldots, W_N$), and area under the curve values (e.g., $A_{P1}, A_{P2}, \ldots, A_{PN}$) associated with the set of parameters.

In some implementations, the scoring platform may determine a set of access point quality scores, for a particular access point, that correspond to different time frames (e.g., a time of the day, a day of the week, a time frame from time A to time B, etc.). For example, and as described elsewhere herein, the scoring platform may generate different models that correspond to different time frames, and use the models to determine different access point quality scores that correspond to the different time frames.

Figure 1D:
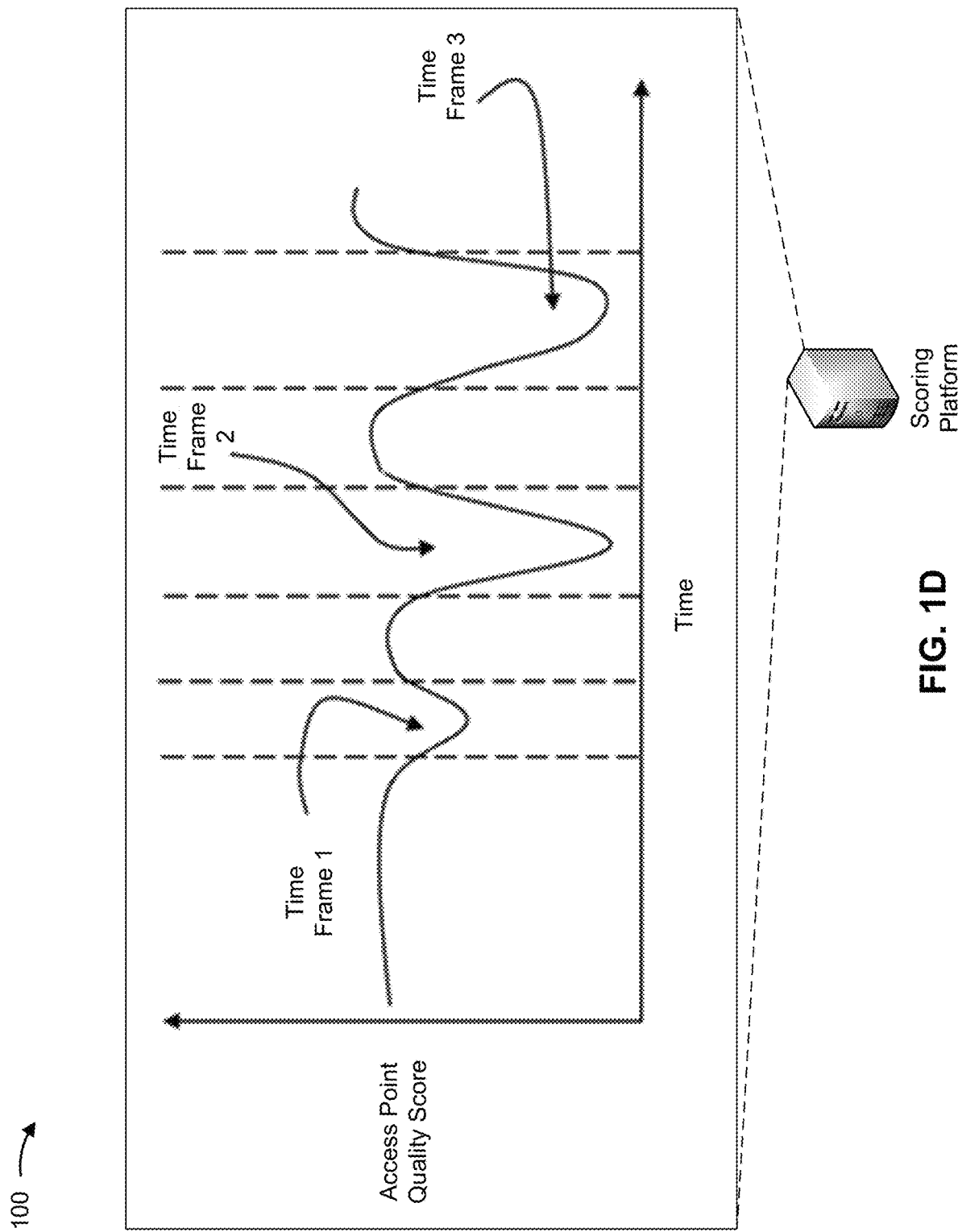

As shown in FIG. 1D, a particular access point may be associated with different access point quality scores based on different time frames. For example, an access point quality score may fluctuate based on a time of day. As shown, time frames 1-3 may be associated with access point quality scores that are generally lower than access point quality scores associated with other time frames. For example, the access network associated with the access point may be more congested during time frames 1-3 than as compared to other time frames, thereby resulting in lower access point quality scores during time frames 1-3.

Figure 1E:
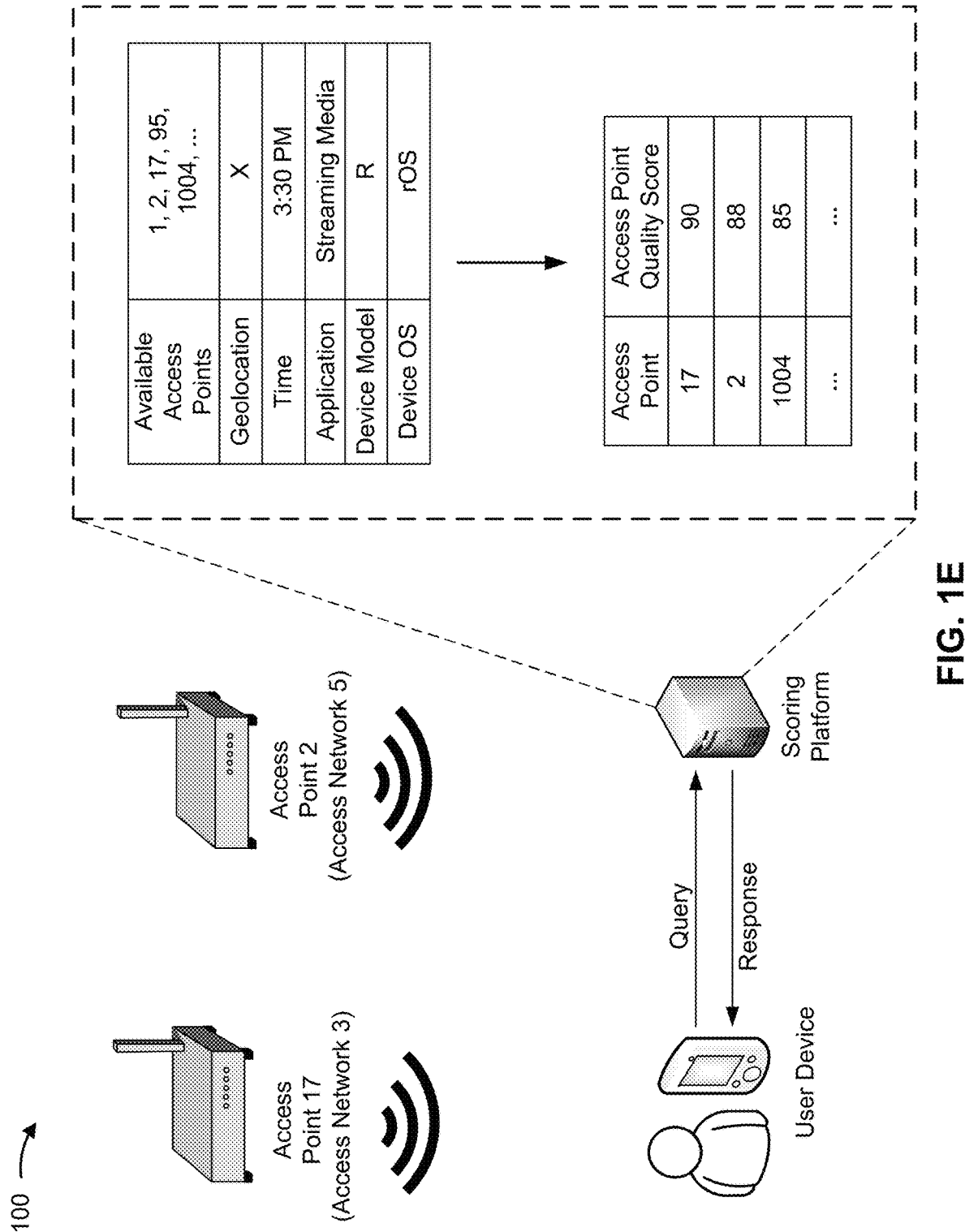

As shown in FIG. 1E, a user device may provide, to the scoring platform, a query for information associated with access point quality scores of available access networks and/or access points. For example, the user device may identify available access networks and/or access points to which the user device may connect, and provide, to the scoring platform, information that identifies the available access networks and/or access points.

In some implementations, the user device may provide information that identifies a geolocation of the user device, a time of day, an application that is being executed by the user device, a device model, an operating system, or the like. In some implementations, the scoring platform may identify access point quality scores associated with the available access networks and/or access points. As shown, the scoring platform may provide, to the user device, a response that includes information that identifies the access point quality scores.

Figure 1F:
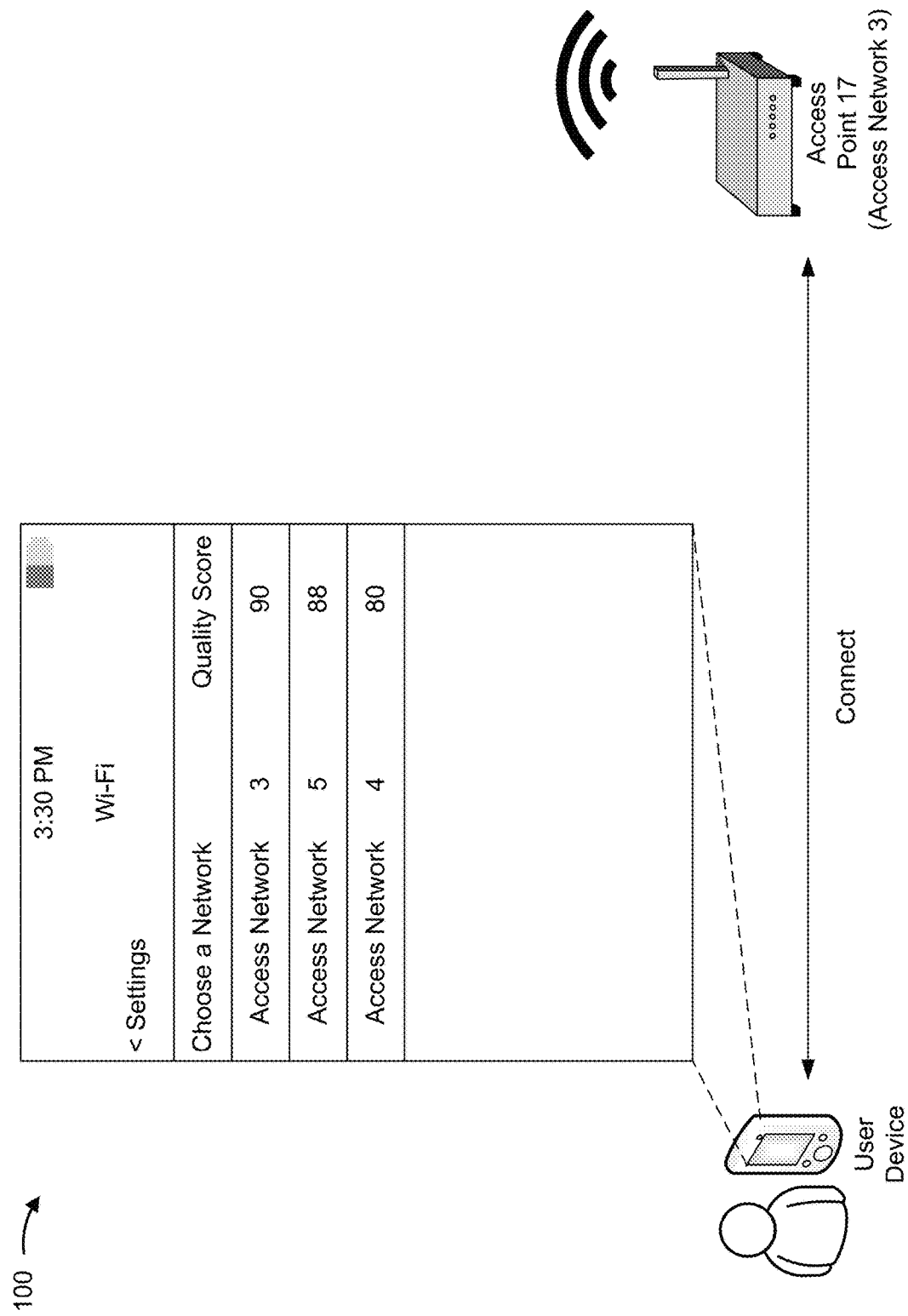

As shown in FIG. 1F, the user device may provide, for display via a user interface, information that identifies the access point quality scores associated with the available access networks and/or access points. For example, as shown, access network 3 may be associated with an access point quality score of 90 that indicates that access network 3 is capable of offering improved throughput, reduced latency, reduced packet loss, reduced jitter, or the like, as compared to other available access networks that are associated with lower access point quality scores.

In some implementations, a user may interact with the user device to cause the user device to connect to access network 3. In other implementations, the scoring platform may provide an instruction that causes the user device to automatically connect to access network 3 (e.g., without a user input).

Some implementations described herein provide a scoring platform that determines access point quality scores based on models that are trained on a large data set (e.g., millions, billions, etc. of data points), and provides information associated with the access point quality scores such that user devices may connect to particular access networks that offer improved performance as compared to other access networks. In this way, some implementations described herein enable user devices to connect to access networks that are capable of providing improved throughput, reduced latency, reduced packet loss, etc. In this way, some implementations described herein conserve user device processor and/or memory resources, and/or conserve network resources.

As indicated above, FIGS. 1A-1F are provided merely as an example. Other examples are possible and may differ from what was described with regard to FIGS. 1A-1F.

Figure 2:
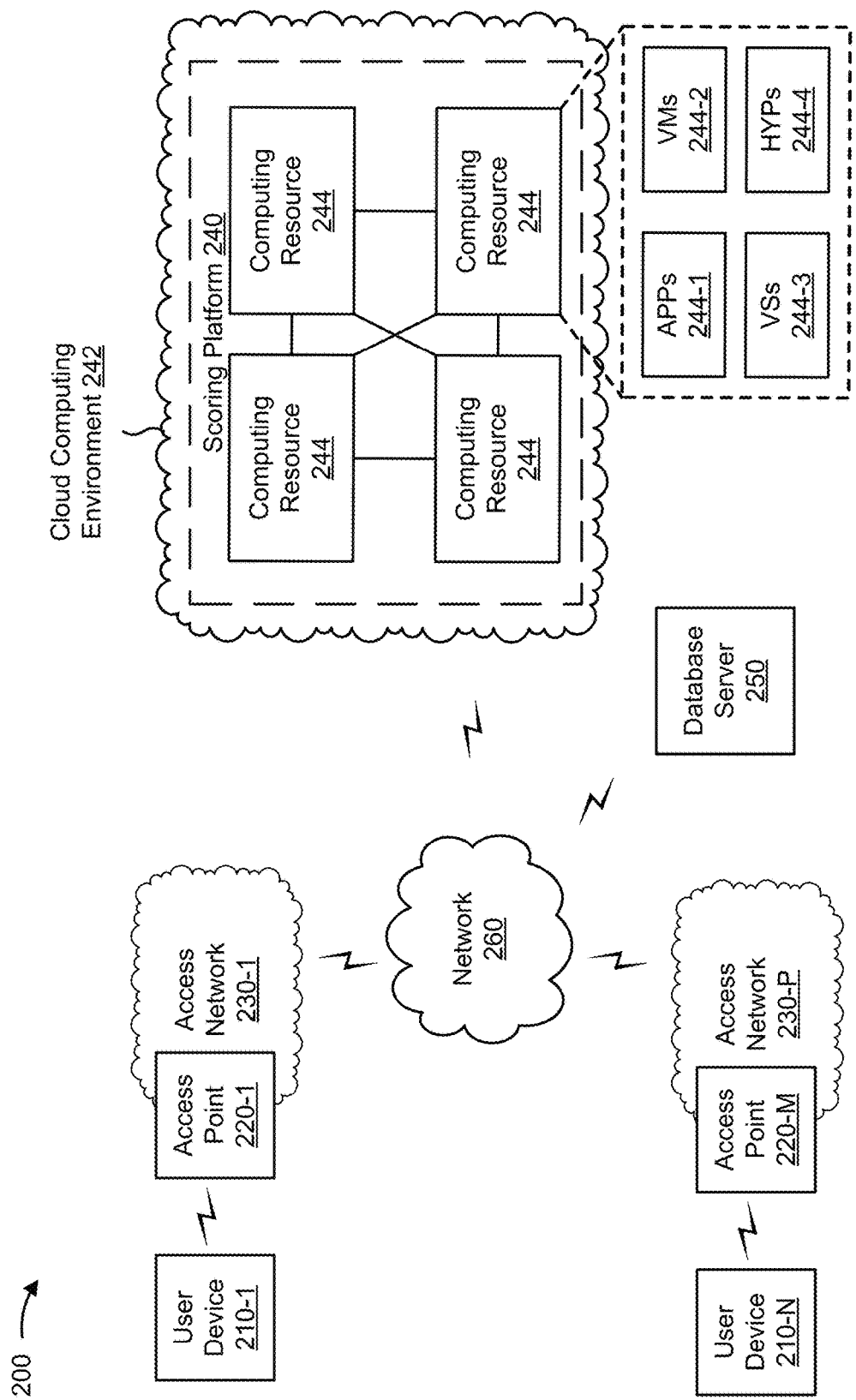
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210-1 through 210-N(N≥1) (hereinafter referred to collectively as "user devices 210," and individually as "user device 210"), one or more access points 220-1 through 220-M (M≥1) (hereinafter referred to collectively as "access points 220," and individually as "access point 220"), one or more access networks 230-1 through 230-P (P≥1) (hereinafter referred to collectively as "access networks 230," and individually as "access network 230"), a scoring platform 240, a database server 250, and a network 260. Devices of environment 200 may interconnect via wired connections, wireless connections, or a combination of wired and wireless connections.

User device 210 includes one or more devices capable of connecting to access network 230 via access point 220. For example, user device 210 may include a communication device, such as a mobile phone (e.g., a smart phone or a radiotelephone), a tablet computer, a laptop computer, a personal gaming system, a wearable communication device (e.g., a smart wristwatch or a pair of smart eyeglasses), a set-top box, or a similar type of device.

Access point 220 includes one or more devices capable of providing access to access network 230. For example, access point 220 may include a router, a gateway, a base station, a modem, or another form of access point. In some implementations, access point 220 may receive, process, and/or transmit data traffic, such as media, audio, video, text, and/or other data traffic, destined for and/or received from user device 210. In some implementations, access point 220 may employ one or more short-range wireless communication protocols for a wireless personal area network (WPAN) and/or a WLAN, such as, for example, IEEE 802.15 (e.g., Bluetooth) and IEEE 802.11 (e.g., Wi-Fi). In other implementations, different short-range wireless protocols and/or frequencies may be used.

Access network 230 includes a wireless local area network (e.g., a WLAN, such as a Wi-Fi network). In other implementations, access network 230 may be replaced with a wide area network (WAN), a metropolitan area network (MAN), a data network, an ad hoc network, and/or a combination of these or other types of networks. In other implementations, access network 230 may include a network that utilizes a cellular radio access technology, such as a fifth generation (5G) network, a long-term evolution (LTE) network, a third generation (3G) network, a code division multiple access (CDMA) network, or the like.

Scoring platform 240 includes one or more devices capable of determining access point quality scores for access networks 230 and/or access points 220 based on machine learning techniques. In some implementations, scoring platform 240 may be designed to be modular such that certain software components can be swapped in or out depending on a particular need. As such, scoring platform 240 may be easily and/or quickly reconfigured for different uses.

In some implementations, as shown, scoring platform 240 may be hosted in cloud computing environment 242. Notably, while implementations described herein describe scoring platform 240 as being hosted in cloud computing environment 242, in some implementations, scoring platform 240 may not be cloud-based (i.e., may be implemented outside of a cloud computing environment) or may be partially cloud-based.

Cloud computing environment 242 includes an environment that hosts scoring platform 240. Cloud computing environment 242 may provide computation, software, data access, storage, etc. services that do not require end-user (e.g., user device 210) knowledge of a physical location and configuration of system(s) and/or device(s) that hosts scoring platform 240. As shown, cloud computing environment 242 may include a group of computing resources 244 (referred to collectively as "computing resources 244" and individually as "computing resource 244").

Computing resource 244 includes one or more personal computers, workstation computers, server devices, or other types of computation and/or communication devices. In some implementations, computing resource 244 may host scoring platform 240. The cloud resources may include compute instances executing in computing resource 244, storage devices provided in computing resource 244, data transfer devices provided by computing resource 244, etc. In some implementations, computing resource 244 may communicate with other computing resources 244 via wired connections, wireless connections, or a combination of wired and wireless connections.

As further shown in FIG. 2, computing resource 244 includes a group of cloud resources, such as one or more applications ("APPs") 244-1, one or more virtual machines ("VMs") 244-2, virtualized storage ("VSs") 244-3, one or more hypervisors ("HYPs") 244-4, or the like.

Application 244-1 includes one or more software applications that may be provided to or accessed by user device 210. Application 244-1 may eliminate a need to install and execute the software applications on user device 210. For example, application 244-1 may include software associated with scoring platform 240 and/or any other software capable of being provided via cloud computing environment 242. In some implementations, one application 244-1 may send/receive information to/from one or more other applications 244-1, via virtual machine 244-2.

Virtual machine 244-2 includes a software implementation of a machine (e.g., a computer) that executes programs like a physical machine. Virtual machine 244-2 may be either a system virtual machine or a process virtual machine, depending upon use and degree of correspondence to any real machine by virtual machine 244-2. A system virtual machine may provide a complete system platform that supports execution of a complete operating system ("OS"). A process virtual machine may execute a single program, and may support a single process. In some implementations, virtual machine 244-2 may execute on behalf of a user (e.g., user device 210), and may manage infrastructure of cloud computing environment 242, such as data management, synchronization, or long-duration data transfers.

Virtualized storage 244-3 includes one or more storage systems and/or one or more devices that use virtualization techniques within the storage systems or devices of computing resource 244. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 244-4 may provide hardware virtualization techniques that allow multiple operating systems (e.g., "guest operating systems") to execute concurrently on a host computer, such as computing resource 244. Hypervisor 244-4 may present a virtual operating platform to the guest operating systems, and may manage the execution of the guest operating systems. Multiple instances of a variety of operating systems may share virtualized hardware resources.

Database server 250 includes one or more devices capable of storing information associated with user devices 210, access points 220, and/or access networks 230. For example, database server 250 may include a server device (e.g., a host server, a web server, an application server, etc.), a cloud computing device, or a similar device. In some implementations, database server 250 may receive and store information associated with parameter values of access points 220 and/or access networks 230. Additionally, or alternatively, database server 250 may provide, to scoring platform 240, information that identifies the parameter values to allow scoring platform 240 to determine access point quality scores. In some implementations, database server 250 may be implemented within cloud computing environment 242.

Network 260 includes one or more wired and/or wireless networks. For example, network 260 may include a WLAN, a local area network (LAN), a WAN, a MAN, a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
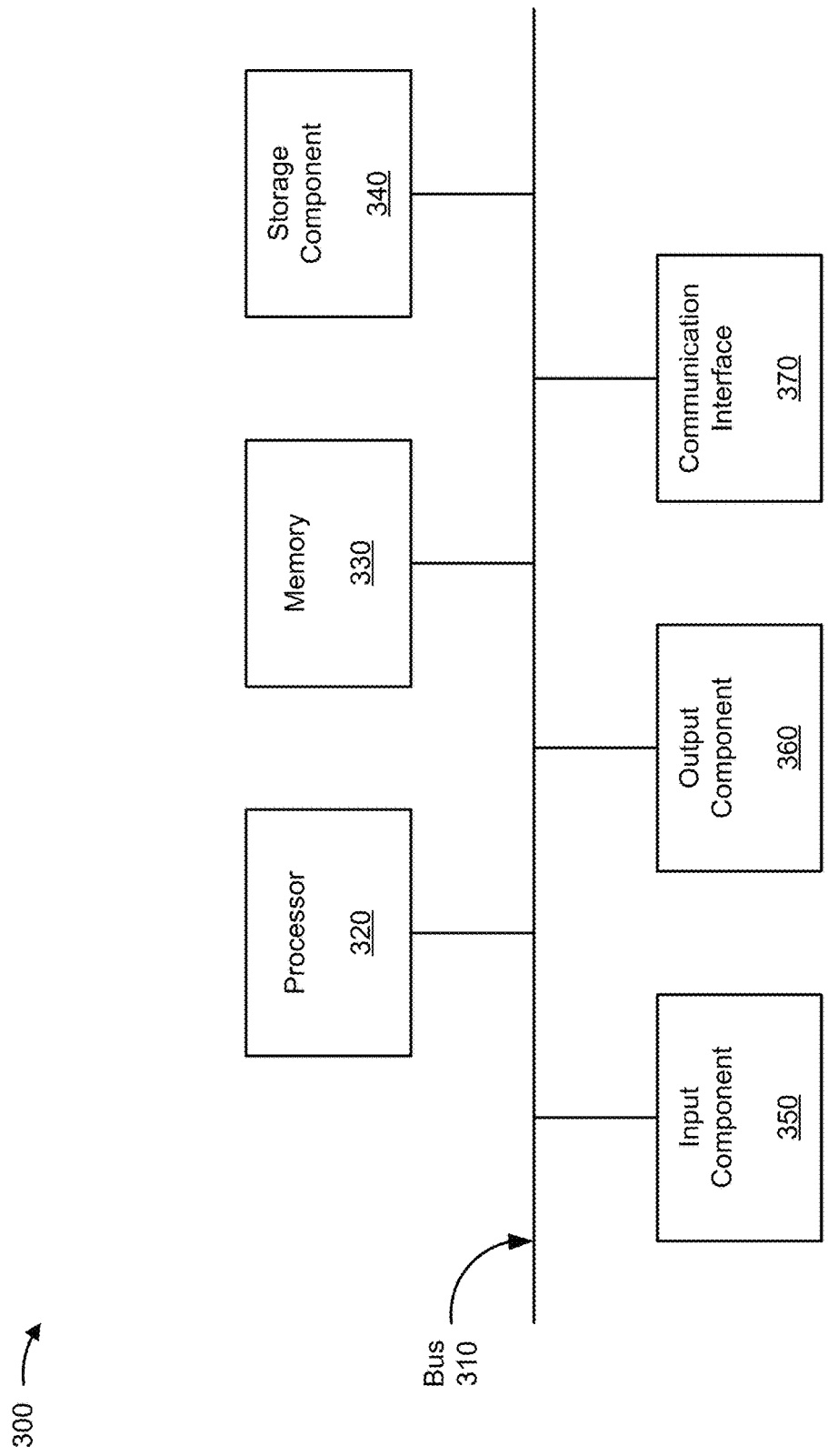
FIG. 3 is a diagram of example components of one or more devices of FIG. 2.

FIG. 3 is a diagram of example components of a device 300. Device 300 may correspond to user device 210, access point 220, scoring platform 240, and/or database server 250. In some implementations, user device 210, access point 220, scoring platform 240, and/or database server 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
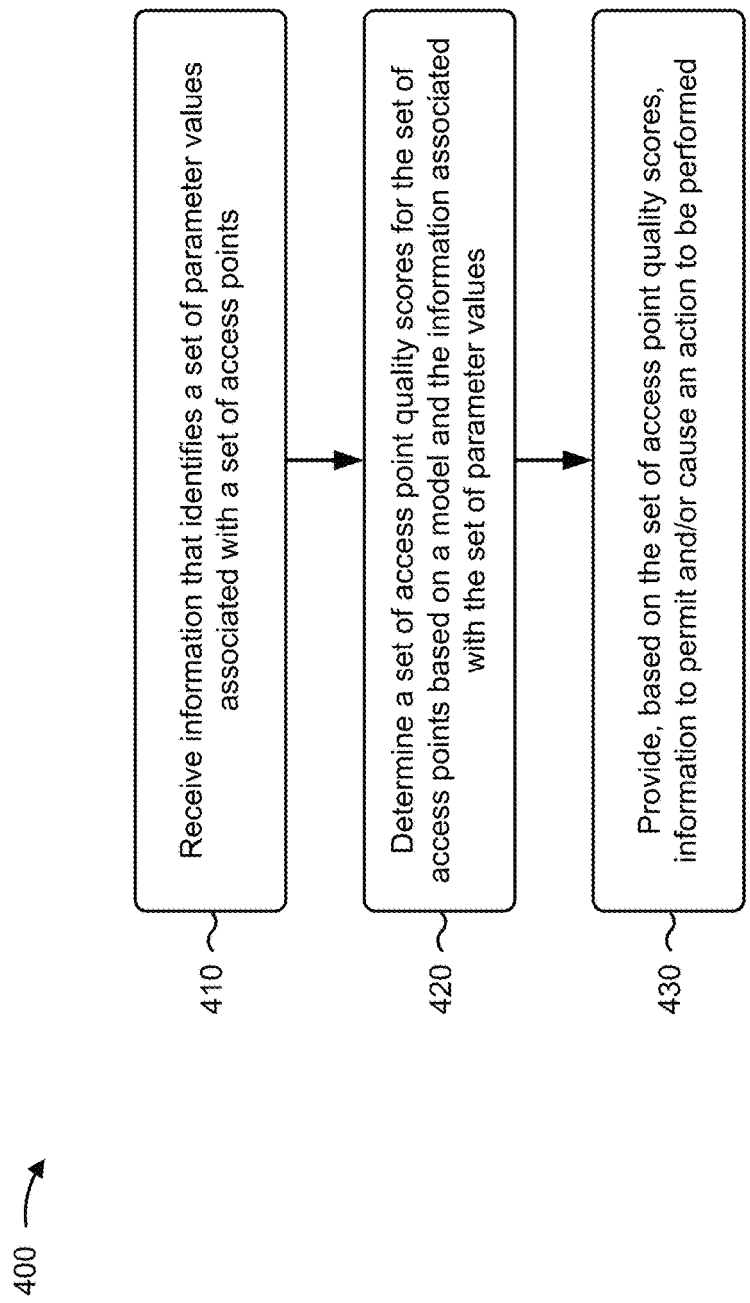
FIG. 4 is a flow chart of an example process for determining access point quality scores based on machine learning techniques.

FIG. 4 is a flow chart of an example process 400 for determining access point quality scores based on machine learning techniques. In some implementations, one or more process blocks of FIG. 4 may be performed by scoring platform 240. In some implementations, one or more process blocks of FIG. 4 may be performed by another device or a group of devices separate from or including scoring platform 240, such as user device 210, access point 220, and/or database server 250.

As shown in FIG. 4, process 400 may include receiving information that identifies a set of parameter values associated with a set of access points (block 410). For example, scoring platform 240 may receive, from user devices 210, access points 220, and/or database server 250, information that identifies a set of parameter values, associated with a set of access points 220, that may be used to determine access point quality scores associated with the set of access points 220 and/or access networks 230.

In some implementations, an access point quality score may be indicative of network performance of an access point 220. Additionally, an access point quality score may be indicative of network performance of an access network 230 that corresponds to an access point 220. For example, user device 210 may connect to access network 230 via access point 220. Thus, an access point quality score may be indicative of network performance of access point 220 and/or access network 230.

In some implementations, a first access point 220 that is associated with a first access point quality score that is greater than a second access point quality score that is associated with a second access point 220 may enable increased throughput, reduced latency, reduced jitter, etc. than as compared to the second access point 220.

In some implementations, user device 210 may connect to a particular access network 230 via a particular access point 220, and may measure and/or determine one or more parameter values based on the connection. For example, a client application that is being executed by user device 210 may measure, determine, log, etc. one or more parameter values associated with a connection to access point 220. In some implementations, user device 210 may provide, to database server 250 and/or scoring platform 240, information that identifies the one or more parameter values.

Additionally, or alternatively, access point 220 may measure and/or determine one or more parameter values associated with an access network 230. For example, access point 220 may measure, determine, log, etc. one or more parameter values associated with access network 230. In some implementations, access point 220 may provide, to database server 250 and/or scoring platform 240, information that identifies the one or more parameter values.

Additionally, or alternatively, one or more network devices, associated with an access network 230, may measure and/or determine one or more parameter values associated with that access network 230. For example, these one or more network devices may measure, determine, log, etc. one or more parameter values associated with access network 230. In some implementations, these one or more network devices may provide, to database server 250 and/or scoring platform 240, information that identifies the one or more parameter values.

In some implementations, a parameter may include information that is associated with a connection between user device 210 and access point 220, information that is associated with user device 210, information that is associated with access point 220, information that is associated with access network 230, information that is associated with neighboring access points 220 and/or access networks 230 (i.e., other access networks 230 and/or access points 220 to which user device 210 may connect), or the like.

In some implementations, a parameter may be associated with a parameter value. In some implementations, a parameter value may include a throughput value, a bandwidth value, a goodput value, a jitter value, a latency value, an amount of packet loss, a delay value, or the like. Additionally, or alternatively, a parameter value may include a reference signal received power (RSRP) value, a received signal code power (RSCP) value, a received signal strength indicator (RSSI) value, a reference signal received quality (RSRQ) value, a block error rate (BLER) value, a signal-to-interference-plus-noise ratio (SINR) value, a path loss value, or the like. Additionally, or alternatively, a parameter value may include a link rate value, a duration of a connection between user device 210 and access point 220, a number of downloaded bytes, or the like.

In some implementations, a parameter value, associated with a particular access point 220, may include a number of neighboring access points 220 (i.e., other access points 220 to which user device 210 may connect and/or that are located within a threshold distance of the particular access point 220), a parameter value associated with a neighboring access point 220, or the like. Additionally, or alternatively, a parameter value may include a number of association failures, a number of connectivity failures, a security capability, an indication of whether the access point 220 is associated with a captive portal, an authentication type, an encryption type, a device type of access point 220, a service provider associated with access point 220, a geolocation of access point 220, a supported bandwidth, a venue (e.g., an airport, a restaurant, a business, a stadium, or the like) associated with access point 220, or the like.

In some implementations, a parameter value may include information that identifies a device type of user device 210, an operating system type of user device 210, a service provider associated with user device 210, a geolocation of user device 210, an application that is being executed by user device 210 during a connection with access point 220, a time of day, or the like.

In some implementations, a data point may refer to information that is associated with a particular connection between a particular user device 210 and a particular access point 220. For example, a data point may include information that identifies user device 210 (e.g., a user device identifier (e.g., a mobile directory number (MDN), an international mobile subscriber identifier (IMSI), or the like), a network address, or the like), information that identifies access point 220 (e.g., a service set identifier (SSID), a network address, a device identifier, or the like), temporal information that identifies a time frame for which the data point is applicable, and/or one or more parameter values that correspond to the above parameters.

In some implementations, scoring platform 240 may receive and/or access millions, billions, trillions, etc. of data points associated with hundreds, thousands, millions, etc. of access points 220. Accordingly, scoring platform 240 may implement one or more big data techniques to efficiently process the data points.

In some implementations, scoring platform 240 may use a parameter value, associated with a first data point, in association with a second data point. For example, scoring platform 240 may identify a first data point that includes common information with a second data point, and use information associated with the first data point in association with the second data point. As an example, scoring platform 240 may identify data points that include a common access point 220, that are associated with the same venue, that are associated with similar venues, that are associated with similar geolocations, that include the same user device 210, that include user devices 210 with the same device type, that include the same time of day, or the like. In this way, in situations where scoring platform 240 has limited information regarding a particular access point 220 as compared to other access points 220, scoring platform 240 may apply parameter values associated with one data point to other data points.

In this way, scoring platform 240 may receive and/or access information associated with millions, billions, trillions, etc. of data points associated with various access points 220, and determine access point quality scores for the access points 220 using machine learning techniques, as described below.

As further shown in FIG. 4, process 400 may include determining a set of access point quality scores for the set of access points based on a model and the information associated with the set of parameter values (block 420). For example, scoring platform 240 may train models using known access point quality scores and known parameter values, and use the models to determine other access point quality scores.

In some implementations, an access point quality score may refer to information that enables comparison between access points 220. For example, an access point quality score may refer to a score, a rank, a designation, a value, a metric, or the like, that enables a first access point 220 to be compared to a second access point 220. As an example, assume that a first access point 220 is associated with a first access point quality score that is greater than a second access point quality score that is associated with a second access point 220. In this case, the first access point 220 may enable a user device 210 to experience improved network performance and/or connection quality (e.g., increased throughput, reduced latency, reduced jitter, etc.) than as compared to the second access point 220.

In some implementations, scoring platform 240 may determine an access point quality score based on one or more parameter values. In some implementations, scoring platform 240 may determine an access point quality score based on a particular parameter value. For example, scoring platform 240 may determine an access point quality score based on a throughput value. In other words, a throughput value may correspond to the access point quality score. As an example, a first access point 220 that is associated with greater throughput values than as compared to a second access point 220 may be associated with a greater access point quality score than as compared to the second access point 220.

While some implementations herein describe the access point quality score as corresponding to a particular parameter (i.e., throughput), it should be understood that other implementations include access point quality scores that are based on other parameters, other combinations of parameters, or the like. In other words, scoring platform 240 may use some or all of the parameter values described in connection with block 410 when determining access point quality scores.

In some implementations, scoring platform 240 may determine an access point quality score based on a model. In some implementations, scoring platform 240 may use machine learning techniques to analyze data (e.g., training data, such as historical data, data associated with known access point quality scores, data associated with known parameter values, etc.) and create models. The machine learning techniques may include, for example, supervised and/or unsupervised techniques, such as artificial networks, Bayesian statistics, learning automata, Hidden Markov Modeling, linear classifiers, quadratic classifiers, decision trees, association rule learning, or the like. In some implementations, scoring platform 240 may use another kind of computer-implemented technique, such as artificial intelligence, machine perception, or computer vision, to analyze parameter values and determine access point quality scores.

In some implementations, scoring platform 240 may receive information that identifies a set of known access point quality scores, and information associated with a set of known parameter values. Additionally, scoring platform 240 may generate a model (e.g., train the model) based on the known access point quality scores and the known parameter values. In this way, scoring platform 240 may receive information associated with access points 220 with unknown access point quality scores, and determine the access point quality scores based on the information and a model. That is, scoring platform 240 may input parameter values into the model and determine an access point quality score based on the parameter values.

In some implementations, scoring platform 240 may determine an access point quality score based on a model associated with the following equation:

$$\text{Access Point Quality Score} = \sum_{y=1}^{m} w_y \int_0^{max} f(x)_{PARAMETER_y} dx$$

For example, the above equation may be represented as:

$$\text{Access Point Quality Score} = (W_1 \times A_{Parameter1}) + (W_2 \times A_{Parameter2}) + \ldots (W_M \times A_{ParameterM})$$

In some implementations, "W" may refer to a weight value associated with a particular parameter. For example, and as described elsewhere herein, particular weight values may be applied to particular parameters when training the model associated with the above equation. In this way, particular parameters may be of more or less importance than as compared to other parameters when generating an access point quality score.

In some implementations, "$A_{Parameter}$" may refer to an area under the curve value associated with a particular parameter. For example, as described elsewhere herein, scoring platform 240 may generate cumulative distribution function (CDF) curves for the respective parameters, and determine respective area under the curve values for the respective parameters.

In some implementations, scoring platform 240 may receive information that identifies a set of data points that are associated with a particular access point 220. Additionally, or alternatively, scoring platform 240 may identify a set of parameter values, that are associated with a particular parameter, based on the set of data points. As an example, each, or some, of the data points may include an RSSI value. In this case, scoring platform 240 may identify a set of RSSI values associated with the particular access point 220 (e.g., thousands of RSSI values, millions of RSSI values, etc.).

In some implementations, scoring platform 240 may determine a CDF based on the set of parameter values for the respective data points. In some implementations, a CDF of a parameter, evaluated at a particular parameter value, may refer to the probability that the parameter will include a parameter value that is less than or equal to the particular parameter value at which the CDF is evaluated. As an example, the CDF of a particular parameter (e.g., RSSI), evaluated at −80 dBm, refers to the probability that an RSSI value that is associated with the particular access point 220 will include a value that is less than or equal to −80 dBm.

In some implementations, scoring platform 240 may generate a CDF curve for a parameter based on parameter values associated with the parameter. Additionally, or alternatively, scoring platform 240 may determine, based on a CDF curve, an area under the curve value for a parameter. For example, scoring platform 240 may integrate the CDF to determine an area under the curve value for the parameter. In some implementations, an area under the curve value, for a parameter, may be indicative of a relative importance of the parameter in determining an access point quality score. As an example, a parameter that is associated with a greater area under the curve value may be associated with less importance than as compared to another parameter that includes a lower area under the curve value. For example, and in some implementations, a lower area under the curve value may indicate that more data points include parameter values that are towards a maximum value associated with the parameter (e.g., where maximum is indicative of higher performance) than as compared to greater areas under the curve.

In some implementations, scoring platform 240 may determine weight values to be applied to the area under the curve values. In some implementations, scoring platform 240 may determine weight values based on an optimization function (e.g., a first-order iterative optimization function, a cost function, or the like). For example, scoring platform 240 may determine weight values that may minimize a difference between a known access point quality score and a determined access point quality score. As an example, scoring platform 240 may use a technique in association with the following equation:

$$\min_{(W_1, W_2, \ldots, W_M)} |Score_{Known} - Score_{Determined}|^2 = \text{function}$$

In some implementations, scoring platform 240 may determine a known access point quality score (i.e., "$Score_{Known}$"). For example, scoring platform 240 may determine a known access point quality score based on a known throughput value associated with an access point 220. Additionally, or alternatively, scoring platform 240 may determine an access point quality score (i.e., "$Score_{Determined}$"). For example, scoring platform 240 may determine an estimated access point quality score based on the equation described elsewhere herein.

In some implementations, scoring platform 240 may determine a difference between the known access point quality score and the determined access point quality score. Further, scoring platform 240 may minimize the difference between the known access point quality score and the estimated access point quality score based on a technique. For example, scoring platform 240 may adjust weight values to be applied to particular area under the curve values associated with particular parameters. In this way, scoring platform 240 may determine, for an access point 220, an access point quality score (i.e., a determined access point quality score) that is substantially similar to a known access point quality score. In this way, scoring platform 240 may use the weight values when determining access point quality scores for access points 220 that are associated with unknown access point quality scores (e.g., for which throughput values are not available).

In some implementations, scoring platform 240 may not have access to throughput values (or another type of parameter value) for particular access points 220. For example, measuring and/or determining throughput values may be computationally expensive, may be impractical, or the like, for user device 210, access points 220, and/or network devices of access networks 230. By using models, some implementations described herein reduce an amount of information that is required to be determined and/or measured by user devices 210, access points 220, and/or network devices of access networks 230, thereby conserving processor and/or memory resources of these devices.

In some implementations, scoring platform 240 may determine an access point quality score for an access point 220 using a model (e.g., the model described above). For example, scoring platform 240 may identify a set of data points that are associated with the access point 220, determine a set of area under the curve values for parameters associated with the data points, apply weight values to the area under the curve values, and determine an access point quality score based on applying the weight values. In this way, scoring platform 240 may compare the access point 220 and other access points 220, as described elsewhere herein.

In some implementations, scoring platform 240 may determine a set of access point quality scores for a particular access point 220. For example, scoring platform 240 may determine a set of access point quality scores that correspond to different time frames. As examples, a time frame may refer to a time of day, a day of the week, a week of the month, a time frame from time A to time B, etc. In some implementations, scoring platform 240 may generate different models that correspond to different time frames. For example, scoring platform 240 may generate different models using data points that correspond to the different time frames. Additionally, or alternatively, scoring platform 240 may determine, for an access point 220, access point quality scores using particular models that correspond to the time frames.

By determining access point quality scores on a time frame basis, scoring platform 240 improves the accuracy of the access point quality scores. For example, an access point 220 and/or an access network 230 may exhibit varying levels of network performance based on a time of day, based on congestion, or the like.

In some implementations, scoring platform 240 may determine a set of access point quality scores that correspond to different client applications that are capable of being executed by user device 210 (e.g., streaming media applications, web browsing applications, gaming applications, messaging applications, or the like), that correspond to different device types of user devices 210, that correspond to different operating system types of user devices 210, or the like. For example, scoring platform 240 may generate models using data points that correspond to particular client applications, particular types of user devices 210, particular operating system types of user devices 210, or the like. By determining access point quality scores on an application basis, a type of user device 210 basis, an operating system of user device 210 basis, or the like, scoring platform 240 improves accuracy of the access point quality scores.

In some implementations, and as described elsewhere herein, scoring platform 240 may provide, to user device 210, information to permit and/or cause an action to be performed, such as causing user device 210 to connect to a particular access point 220, causing access point 220 to adjust an antenna characteristic, causing access point 220 to change geolocation, causing user device 210 to connect to another type of access network 230, causing user device 210 to provide information for display (e.g., to notify a user of access point quality scores), cause information to be provided to a central repository (e.g., for further analytics), or the like. In this way, scoring platform 240 enables user device 210 to connect to a particular access network 230 via a particular access point 220 that may offer improved network performance (e.g., increased throughput, lower latency, less packet loss, etc.) than as compared to another available access network 230 and/or access point 220.

As further shown in FIG. 4, process 400 may include providing, based on the set of access point quality scores, information to permit and/or cause an action to be performed (block 430). For example, scoring platform 240 may provide, based on the set of access point quality scores, information to permit and/or cause an action to be performed in association with an access point 220 and/or access network 230.

In some implementations, scoring platform 240 may provide, to user device 210, information to permit and/or cause user device 210 to perform an action. In some implementations, scoring platform 240 may receive information associated with user device 210. For example, user device 210 may provide, to scoring platform 240, information that identifies available access points 220 and/or access networks 230 as identified by user device 210, information that identifies a geolocation of user device 210, information that identifies preferred access points 220 and/or access networks 230, information that identifies an application that is being executed by user device 210, information that identifies a type of user device 210, information that identifies an operating system type of user device 210, information that identifies a time frame, or the like.

In some implementations, scoring platform 240 may identify access point quality scores associated with the available access points 220 and/or access networks 230 based on the information received from user device 210. Alternatively, scoring platform 240 may identify access point quality scores associated with the available access points 220 without having received information from user device 210. In some implementations, scoring platform 240 may provide, to user device 210, information that identifies the access point quality scores.

In some implementations, the action may correspond to user device 210 providing, for display, information that identifies the access point quality scores. For example, scoring platform 240 may provide, to user device 210, information that enables user device 210 to provide, for display via a user interface, information that identifies respective access point quality scores of the available access points 220 and/or access networks 230. In this way, a user may interact with user device 210 to select a particular access network 230 that is associated with an access point 220 that includes a particular access point quality score (e.g., the greatest access point quality score, an access point quality score that satisfies a threshold, or the like).

In some implementations, the action may correspond to user device 210 automatically (i.e., without user input) connecting to access point 220. For example, scoring platform 240 may provide, to user device 210, an instruction that causes user device 210 to automatically connect to a particular access point 220. In some implementations, scoring platform 240 may identify available access networks 230 and/or access points 220, and determine a particular access network 230 and/or access point 220 to which user device 210 is to connect. For example, scoring platform 240 may identify the access network 230 and/or access point 220 with the greatest access point quality score, with an access point quality score that satisfies a threshold, or the like. Additionally, scoring platform 240 may provide, to user device 210, an instruction that causes user device 210 to automatically connect to the particular access network 230 and/or access point 220.

In some implementations, the action may correspond to user device 210 automatically switching from being connected to a first type of access network 230 to a second type of access network 230. For example, user device 210 may be connected to a cellular network, and may be capable of connecting to a WLAN. In this case, scoring platform 240 may automatically cause user device 210 to be switched from being connected to the cellular network to the WLAN. Alternatively, scoring platform 240 may cause user device 210 to switch from being connected to a WLAN to being connected to a cellular network. In this way, network resources may be more efficiently utilized, may be conserved, or the like.

In this way, user device 210 may connect to a particular access network 230 and/or access point 220 that enables increased throughput, reduced latency, reduced jitter, reduced packet loss, etc. as compared to other access networks 230 and/or access points 220 that are available to user device 210. Additionally, in this way, some implementations described herein conserve user device 210 processor and/or memory resources, and/or conserve network resources by reducing a number of retransmissions that occur due to lost packets, a bad connection, or the like.

In some implementations, the action may correspond to user device 210 providing, for display, information that identifies directions associated with connecting to a particular access point 220 and/or access network 230. For example, scoring platform 240 may identify a particular geolocation that is associated with high access point quality scores, and compare the particular geolocation and a geolocation of user device 210. In some implementations, scoring platform 240 may provide, to user device 210, information that identifies the particular geolocation, directions to the particular geolocation, or the like. For example, scoring platform 240 may provide step-by-step instructions that enable a user of user device 210 to identify a route to the particular geolocation (i.e., a geolocation at which service quality may improve).

In some implementations, scoring platform 240 may provide, to another device, information to permit and/or cause an action to be performed. In some implementations, the action may correspond to providing a message (e.g., an email, a short message service (SMS) message, a notification, or the like) that includes information that identifies the access point quality scores. For example, scoring platform 240 may provide, to a client device, information that identifies particular access points 220 and/or access point quality scores. As an example, a network operator may view the information and identify particular access points 220 that are associated with low access point quality scores, high access point quality scores, etc. In this way, some implementations described herein enable a network operator to identify particular access networks 230 and/or access points 220 that are associated with low access point quality scores, and take corrective action, such as activate a new access point 220 and/or access network 230, redistribute one or more existing access points 220 and/or access networks 230 to improve a service area, or the like.

In some implementations, the action may correspond to automatically activating an access point 220 and/or an access network 230. For example, scoring platform 240 may identify a particular area (e.g., a geolocation, a venue, or the like) that is associated with low access point quality scores, which may indicate that existing (i.e., active) access points 220 and/or access networks 230 associated with the particular area are congested, are prone to congestion, are incapable of accommodating an amount of network traffic, etc. Further, scoring platform 240 may automatically cause an access point 220 and/or an access network 230 to be activated in association with the particular area. In this way, user devices 210 that are associated with the particular area may connect to the activated access points 220 and/or access networks 230, which may reduce congestion associated with the existing access points 220 and/or access networks 230 of the area.

In some implementations, the action may correspond to automatically deactivating an access point 220 and/or access network 230. For example, scoring platform 240 may identify an particular area that is associated with high access point quality scores, which may indicate that existing access points 220 and/or access networks 230 are not congested, are not prone to congestion, are underutilized, are capable of accommodating additional user devices 210 while still providing high service quality, etc. Further, scoring platform 240 may deactivate particular access points 220 and/or access networks 230 associated with the particular area. In this way, scoring platform 240 may conserve network resources by deactivating access points 220 and/or access networks 230 that are underutilized, thereby enabling other access points 220 and/or access networks 230 to accommodate more network traffic while still providing high service quality.

In some implementations, the action may correspond to automatically causing a geolocation of an access point 220 to be changed. For example, an access point 220 may be mobile (i.e., capable of being moved), may be attached to a vehicle (e.g., an unmanned aerial vehicle (UAV), a car, a plane, etc.), or the like. In this case, scoring platform 240 may provide an instruction to a device associated with the vehicle that causes a geolocation of access point 20 to be changed. For example, scoring platform 240 may identify an area that is associated with low access point quality scores, and cause access point 220 to be moved to the area. In this way, scoring platform 240 may cause access points 220 to be moved to areas associated with low access point quality scores, thereby enabling user devices 210 that are located in the area to receive increased service quality.

In some implementations, the action may correspond to automatically causing an antenna characteristic of an antenna of access point 220 to be adjusted. For example, an antenna characteristic may correspond to a signal transmission power, an antenna height, an antenna direction, an antenna radiation pattern, an antenna beamforming technique, an antenna beamsteering technique, or the like. For example, scoring platform 240 may identify an access point 220 that is associated with a particular access point quality score, and provide an instruction to access point 220 that causes access point 220 to adjust an antenna characteristic (e.g., boost signal transmission power, reduce signal transmission power, adjust a radiation pattern, increase an antenna height, decrease an antenna height, etc.). In some implementations, the action may correspond to automatically causing an access point characteristic to be adjusted. For example, an access point characteristic may correspond to an amplifier operation, a modulation scheme, an encoding scheme, a transmission scheme, etc. In this way, scoring platform 240 may cause access point 220 to conserve resources when access point quality scores are generally high, and/or improve network performance when access point quality scores are low.

In this way, some implementations described herein enable user device 210 to receive information that identifies access point quality scores associated with available access networks 230 and/or access points 220 (e.g., access networks 230 and/or access points 220 to which user device 210 may connect). Additionally, in this way, user device 210 may connect to a particular access network 230 and/or access point 220 that are associated with a higher access point quality score than as compared to other available access networks 230 and/or access points 220. Thereby, implementations described herein enable improved throughput, reduced latency, reduced congestion, reduced network resource consumption, etc. as compared to situations where user device 210 connects to an access network 230 and/or access point 220 that are associated with lower access point quality scores.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a scoring platform to receive information that identifies a set of parameter values associated with a set of access points, determine access point quality scores based on the information that identifies the set of parameter values and a model, and provide, based on the access point quality scores, information that permits and/or causes actions to be performed.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
     receive information that identifies a set of parameter values associated with a set of access points;
     determine a set of access point quality scores based on a model and the information that identifies the set of parameters values,
       the set of access point quality scores being indicative of network performance of a set of access networks that correspond to the set of access points, and
       the model being trained based on a set of values that corresponds to a set of cumulative distribution function (CDF) curves associated with the set of parameter values; and
     provide, based on the set of access point quality scores, information to permit an action to be performed.

2. The device of claim 1, wherein the set of parameter values include one or more of:
   a throughput value,
   a latency value,
   a bandwidth value,
   a goodput value,
   a jitter value,
   an amount of packet loss,
   a delay value,
   a reference signal received power (RSRP) value,
   a received signal code power (RSCP) value,
   a received signal strength indicator (RSSI) value,
   a reference signal received quality (RSRQ) value,
   a block error rate (BLER) value,
   a signal-to-interference-plus-noise ratio (SINR) value,
   a path loss value,
   a link rate value,
   a duration of a connection between a user device and an access point, or
   a number of downloaded bytes.

3. The device of claim 1, wherein the model is generated based on a set of known access point quality scores and another set of parameter values,
   the other set of parameter values being associated with another set of access points.

4. The device of claim 3, wherein the one or more processors are further to:
   determine a set of area under a curve values based on the other set of parameter values; and
   determine a set of weight values based on the set of area under the curve values and the set of known access point quality scores; and
   wherein the one or more processors, when generating the model, are to:
     generate the model based on the set of weight values.

5. The device of claim 1, wherein the one or more processors are further to:
   generate a set of models based on a set of time frames, the set of models including the model; and
   wherein the one or more processors, when determining the set of access point quality scores, are to:
     determine the set of access point quality scores based on the set of models.

6. The device of claim 1, wherein the action corresponds to causing a location of an access point, of the set of access points, to be adjusted.

7. The device of claim 1, where the set of access networks are wireless local area networks.

8. A non-transitory computer-readable medium storing instructions, the instructions comprising:
   one or more instructions that, when executed by one or more processors, cause the one or more processors to:
     train a model based on a set of known access point quality scores and a set of known parameter values,
       the set of known access point quality scores and the set of known parameter values being associated with a first set of access points, and
       the model being trained based on a set of values that corresponds to a set of cumulative distribution function (CDF) curves associated with the set of known parameter values;
     determine a set of access point quality scores associated with a second set of access points,
       the set of access point quality scores being determined based on the model and information that identifies a set of parameter values associated with the second set of access points; and
     provide, based on the set of access point quality scores, information to permit an action to be performed in association with an access point in the second set of access points.

9. The non-transitory computer-readable medium of claim 8, wherein the set of access point quality scores is indicative of network performance of a second set of access networks that correspond to the second set of access points.

10. The non-transitory computer-readable medium of claim 9, where the second set of access networks are wireless local area networks.

11. The non-transitory computer-readable medium of claim 8, wherein the one or more instructions, that cause the one or more processors to provide the information to cause the action to be performed, cause the one or more processors to:
   provide, to a user device, an instruction to cause the user device to automatically connect to the access point based on an access point quality score, of the set of access point quality scores, that corresponds to the access point.

12. The non-transitory computer-readable medium of claim 8, wherein the one or more instructions, when executed by the one or more processors, further cause the one or more processors to:

adjust a set of weight values based on the set of known access point quality scores and the set of known parameter values; and
wherein the one or more instructions, that cause the one or more processors to train the model, cause the one or more processors to:
train the model based on adjusting the set of weight values.

13. The non-transitory computer-readable medium of claim 8, wherein the one or more instructions, when executed by the one or more processors, further cause the one or more processors to:
identify a set of time frames that correspond to the set of known parameter values; and
wherein the one or more instructions, that cause the one or more processors to train the model, cause the one or more processors to:
train the model based on the set of time frames.

14. A method, comprising:
generating, by a device, a model based on a set of known access point quality scores and a first set of parameter values,
the set of known access point quality scores and the first set of parameter values being associated with a first set of access points;
determining, by the device, a set of access point quality scores, for a second set of access points, based on a second set of parameter values and the model,
the set of access point quality scores being indicative of network performance of a second set of access networks that correspond to the second set of access points, and
the model being trained based on a set of values that corresponds to a set of cumulative distribution function (CDF) curves associated with the set of parameter values; and
providing, by the device, information to permit an action to be performed by a user device or an access point in the second set of access points.

15. The method of claim 14, further comprising:
identifying a set of time frames associated with the first set of parameter values; and
wherein generating the model comprises:
generating the model, and at least one other model, based on the set of time frames.

16. The method of claim 14, further comprising:
receiving, from the user device, information that identifies the second set of access networks; and
providing, to the user device, information that identifies the set of access point quality scores associated with the second set of access networks.

17. The method of claim 14, wherein providing the information to permit the action to be performed comprises:
providing, to the user device, an instruction to cause the user device to connect to an access network in the second set of access networks.

18. The method of claim 14, further comprising:
determining a set of area under a curve values based on the second set of parameter values; and
wherein determining the set of access point quality scores comprises:
determining the set of access point quality scores based on the set of area under the curve values.

19. The method of claim 14, wherein the first set of parameter values corresponds to a first set of parameters and the second set of parameters corresponds to a second set of parameters, and wherein the first set of parameters includes at least one parameter that is not included in the second set of parameters.

20. The method of claim 14, wherein the first set of parameter values includes one or more of:
a throughput value,
a latency value,
a bandwidth value,
a goodput value,
a jitter value,
an amount of packet loss,
a delay value,
a reference signal received power (RSRP) value,
a received signal code power (RSCP) value,
a received signal strength indicator (RSSI) value,
a reference signal received quality (RSRQ) value,
a block error rate (BLER) value,
a signal-to-interference-plus-noise ratio (SINR) value,
a path loss value,
a link rate value,
a duration of a connection between the user device and the access point, or
a number of downloaded bytes.

* * * * *